(12) United States Patent
Ge et al.

(10) Patent No.: US 7,652,991 B2
(45) Date of Patent: Jan. 26, 2010

(54) NETWORK WITH DISTRIBUTED AUTHENTICATION CONTROL

(75) Inventors: An Ge, Plano, TX (US); Maher Ali, Richardson, TX (US); Girish Chiruvolu, Plano, TX (US)

(73) Assignee: Alcatel Lucent, Paris (FR)

( * ) Notice: Subject to any disclaimer, the term of this patent is extended or adjusted under 35 U.S.C. 154(b) by 686 days.

(21) Appl. No.: 11/305,560

(22) Filed: Dec. 16, 2005

(65) Prior Publication Data

US 2007/0140268 A1 Jun. 21, 2007

(51) Int. Cl.
*H04L 12/56* (2006.01)
*G06F 21/00* (2006.01)

(52) U.S. Cl. .................. 370/230; 370/252; 370/255; 726/22

(58) Field of Classification Search .................. 370/229, 370/230, 230.1, 231–235, 236, 236.1, 236.2, 370/252, 254, 255, 256
See application file for complete search history.

(56) References Cited

U.S. PATENT DOCUMENTS

| | | | |
|---|---|---|---|
| 6,442,608 B1 * | 8/2002 | Knight et al. ................ 709/225 |
| 7,194,761 B1 * | 3/2007 | Champagne ................... 726/6 |
| 7,290,040 B2 * | 10/2007 | Newcombe et al. .......... 709/217 |
| 7,471,647 B2 * | 12/2008 | Ge et al. ....................... 370/256 |
| 2003/0074584 A1 * | 4/2003 | Ellis ............................ 713/201 |
| 2003/0110378 A1 * | 6/2003 | Yamada et al. ............... 713/161 |
| 2003/0172290 A1 * | 9/2003 | Newcombe et al. .......... 713/200 |
| 2004/0093519 A1 * | 5/2004 | Grobman ...................... 713/201 |
| 2006/0225133 A1 * | 10/2006 | Balasubramaniyan et al. . 726/22 |
| 2007/0005985 A1 * | 1/2007 | Eldar et al. ................... 713/183 |

FOREIGN PATENT DOCUMENTS

EP 1235389 A1 8/2002

* cited by examiner

*Primary Examiner*—Chi H Pham
*Assistant Examiner*—Ahmed Elallam
(74) *Attorney, Agent, or Firm*—Garlick Harrison & Markison (57) ABSTRACT

A bridged network system (10). The system comprises at least one network server (NS) for receiving and responding to authentication session requests. The system also comprises a plurality of bridge nodes ($BRN_x$). Each bridge node in the plurality of bridge nodes is connected to communicate with at least one other neighboring bridge node in the plurality of nodes, and each bridge node comprises at least one port ($BP_x$), circuitry for communicating with at least one of either another bridge node in the plurality of nodes or the at least one network server, and circuitry for limiting (40, 42) a number of authentication sessions active at a same time through the at least one port. The system also comprises a central resource (e.g., $BRN_0$). The central resource comprises circuitry for directing (74) the circuitry for limiting, for at least two bridge nodes in the plurality of bridge nodes, in response to a number of authentication sessions active at a same time through two or more bridge nodes in the plurality of bridge nodes.

20 Claims, 3 Drawing Sheets

NETWORK WITH DISTRIBUTED AUTHENTICATION CONTROL

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a network with distributed authentication control.

Networks have found favor in many applications in the communications industry and for various reasons. For example, Ethernet is a widely used and cost effective medium, with numerous interfaces and speed capability up to the 10+ Gbps range. Ethernet networks may be used in applications that are incorporated at a single location by a single entity such as a company or the like, or the entity as an alternative may couple various local area networks ("LANs") together to form a larger network, sometimes referred to as a wide area network ("WAN"). Still further, Ethernet technology is also often used to form a network sometimes referred to as a Metro Ethernet Network ("MEN"), which is generally a publicly accessible network that is often affiliated with a metropolitan area—hence, the term "Metro" Ethernet. A MEN provides a so-called Metro domain, typically under the control of a single administrator or manager, such as an Internet Service Provider ("ISP"). A MEN is typically used to connect between an access network and a core network. The access network often includes edge nodes that operate as bridges to private or end users, that is, customer nodes making connectivity to the network. The core network is used to connect to other Metro Ethernet Networks and it provides primarily a frame switching function.

Ethernet networks typically include a number of bridges. A bridge typically operates to receive a block of data referred to as a frame, which is sometimes referred to by other names such as a packet or message and which in any event includes a portion, such as a header, with both a source and destination address. The frame may include other information, such as a payload or data that is being communicated from the device at the source address to the device at the destination address. The bridge receives this frame at a port and may forward the frame based on the frame's destination address and via a port to that destination, where both the source and the destination may be another bridge or a user or other node in the Ethernet network.

Another function of a bridge is to perform authentication, sometimes in combination with a network server that is either directly connected to the bridges or logically accessible by the bridge through one or more additional bridges. In this context, IEEE 802.1X provides port access control for Ethernet and in this regard there is an Extensible Authentication Protocol ("EAP"). EAP provides certain functions and a negotiation of a desired EAP authentication method, where there are various different methods. In some of these methods, when a new bridge node link is enabled or connected to an existing bridge node, the authentication process commences, whereby the genuineness of the new connection is verified. Particularly, the existing bridge node to which the new link is connected becomes an authenticator with respect to the new node connected to the bridge, and the new node or the port on that node is a supplicant. The supplicant, in effect, requests to the authenticator an authentication which, if granted, permits the supplicant device to join the trusted network. In response to the supplicant's request, the authenticator communicates with a network server, again either directly if the authenticator is directly connected to the server or logically through one or more bridges that are in the path of the authenticator to the network server. The entirety of this just-described process is sometimes referred to as an authentication session, which commences with the initial request of the supplicant and continues until the supplicant is granted (or denied) authority to join the network. Note that various frames may go back and forth between the supplicant and authenticator to satisfy the rigors of the authentication and, thus, a certain amount of time may be expended before the session is completed by either a grant of authority or a denial of service ("DoS").

An unfortunate development in the heavy use of networks in contemporary computing has been the efforts of wrongdoers to disrupt the operation of the network or cause unanticipated increases in the use of network resources. In the context of Ethernet networks, one malicious effort has been for a user to connect to a network bridge and then flood the bridge with an unusually large number of authentication requests. This effort may be by connection to a single bridge node, or the wrongdoer may coordinate numerous requests at different bridges and that overlap in time. The mechanism for such an attack may take many forms, such as email, viruses, and remote access by ways of example. In any event, if successful, the network server becomes overburdened and may begin large-scale denial of service, thereby preventing legitimate users from access to the network.

By way of additional background, the prior art includes a few approaches that attempt to reduce the effects of wrongful use of authentication. In one approach, each bridge node has a limit to the number of authentication requests it will accept from a same user at a same port while an authentication session is already opened at that port. In another approach, each bridge node has a limit to the rate at which it will receive authentication requests. Both of these approaches may prove workable in some instances, but in connection with the present preferred embodiments there are noticed that certain drawbacks arise in these approaches. Specifically, the prior art approaches are localized to each bridge. As a result, as one drawback, in a particular attack on the network, the wrongdoer might distribute the number of requests to numerous different bridge nodes. In this case, each such bridge node may not perceive that it is being attacked and thereby forward each such request to the network server. Collectively as these requests reach the server, however, the server may be overwhelmed and be forced to deny service, both to those requests as well as to legitimate requests it is receiving from the same or other bridges during in the overlapping time period. As another drawback, under the prior art approaches, if a bridge detects a number of requests that exceeds its quota and responds with a pushback to the requestor, that requester may itself be another bridge node, and so forth through a number of bridge nodes. Thus, there is delay as the pushback is forced to propagate backward until it reaches the bridge(s) that is connected to the trouble causing requestor.

Given the preceding, improvements may be made to the prior art, as is achieved by the preferred embodiments, which are further detailed below.

BRIEF SUMMARY OF THE INVENTION

In one preferred embodiment, there is a bridged network system. The system comprises at least one network server for receiving and responding to authentication session requests. The system also comprises a plurality of bridge nodes. Each bridge node in the plurality of bridge nodes is connected to communicate with at least one other neighboring bridge node in the plurality of nodes, and each bridge node comprises at least one port, circuitry for communicating with at least one of either another bridge node in the plurality of nodes or the at least one network server, and circuitry for limiting a number of authentication sessions active at a same time through the at least one port. The system also comprises a central resource. The central resource comprises circuitry for directing the circuitry for limiting, for at least two bridge nodes in the plurality of bridge nodes, in response to a number of authentication sessions active at a same time through two or more bridge nodes in the plurality of bridge nodes.

Other aspects are also described and claimed.

DETAILED DESCRIPTION OF THE INVENTION

Figure 1:
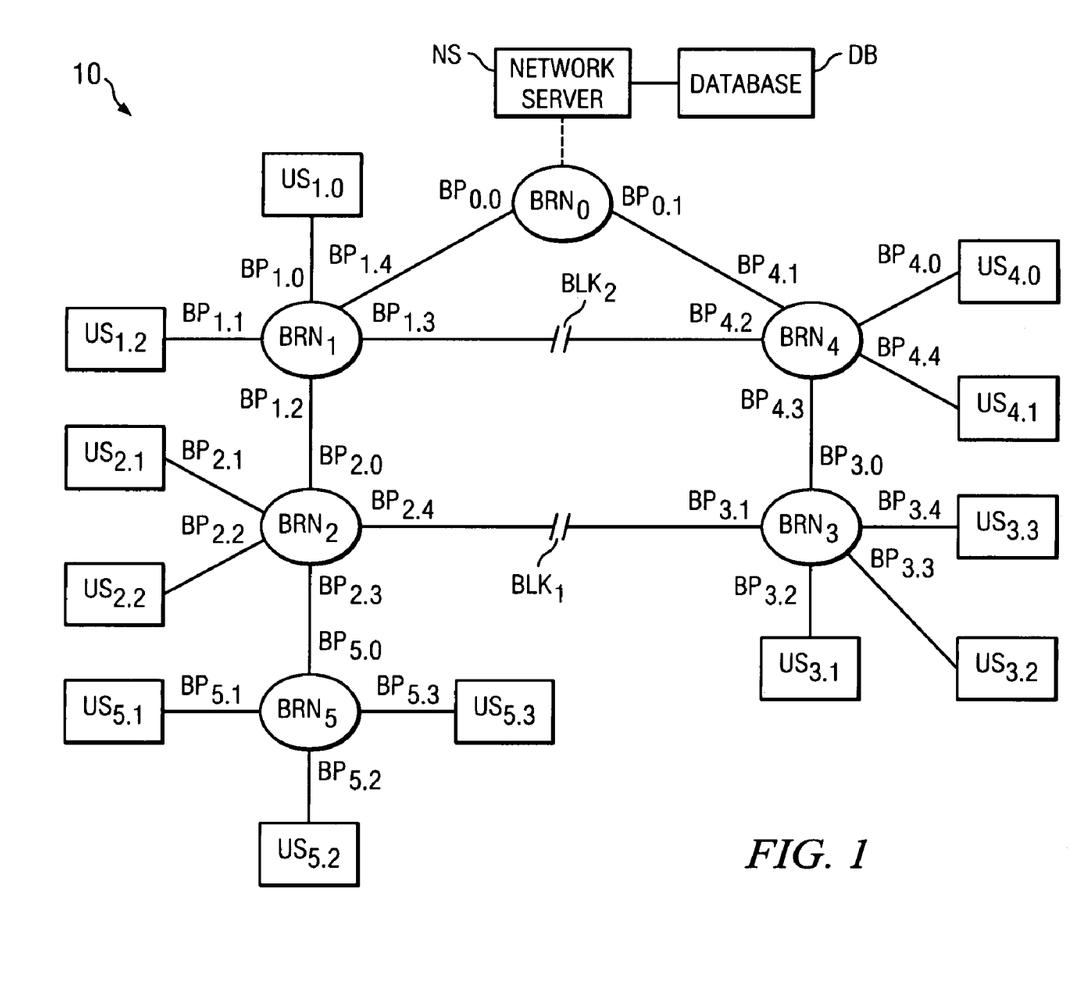
FIG. 1 illustrates a network system as an example of the preferred embodiments.

FIG. 1 illustrates a network system designated generally at 10 and as an example of the preferred embodiments. In general at the level illustrated in FIG. 1, each item in system 10 is known in the art, where the nodes shown therein may be constructed using various forms of hardware and software programming to perform steps consistent with the discussions in this document. However, as detailed later, the methodology of operation as well as certain functions added to the bridge nodes provide for the preferred embodiments and operate to improve system 10 as a whole, and such methodology and functionality may be readily added into the existing hardware and software programming of a system such as system 10. Indeed, as a result, the preferred embodiments are flexible and scalable to different sized networks. Lastly, system 10 may be implemented as an Ethernet or other bridged network, and it is shown by way of example and not by way of limitation to the inventive scope.

System 10 generally represents a bridged network, such as an Ethernet network, that includes a number of nodes. In the context of Ethernet, some of the nodes may be referred to as Ethernet bridges or switches, and for sake of consistency the terms "bridge" or "bridge node" will be used in this document, but without limiting the inventive scope. The physical connections between bridges and other devices in system 10 may be referred to in various manners and may be achieved in various ways, but in any event they permit bi-directional communication between any two connected bridge nodes. Communication is by blocks of data, often referred to as messages, frames, or packets. Within the network and as also known in the art, additional routing control may be imposed, such as with one or more spanning trees that thereby define the path along which messages are communicated within the network for communication along a given spanning tree. Indeed, the connectivity of FIG. 1 is intended to illustrate such a spanning tree, with it understood that such connectivity is therefore both physical and logical in form, where additional physical connections may exist but are not shown because they are not part of the present spanning tree.

Looking then to system 10 in general, it includes six bridge nodes $BRN_0$ through $BRN_5$. Bridge node $BRN_0$ is coupled to a network server NS, which is also a processing unit that may include various hardware and/or software to perform certain functions; in this regard and for sake of the preferred embodiments, one such function is for network server NS to receive authentication requests and to store sufficient information to respond to such requests, that is, to determine if a new connection to system 10 should be authorized. As detailed below in this regard, when a user station enables or causes a new connection with a bridge node, an authentication session is opened and directed to network server NS. Further, while a single network server NS is shown, system 10 may include more than one such network server. In any event, the authentication session commenced with network server NS (or one of more than one network servers) continues with one more communications, and only if network server NS approves, by sending an appropriate response to the request, is that new connection permitted authority to communicate with other nodes in system 10. Thus, network server NS is sometimes referred to as an authentication server and is coupled to a database DB. Also, the coupling from bridge node $BRN_0$ to network server NS is shown by way of a dashed line because in actuality all bridge nodes in system 10 may communicate with network server NS via one more bridge nodes, while the explicit coupling to bridge node $BRN_0$ is shown in FIG. 1 because bridge node $BRN_0$ is directly-connected to network server NS without any additional intermediate bridge node between the two. In addition, while not shown, a network administrator (or "network manager") also may have access to network server NS for various reasons, including the ability to receive warnings in connection with suspiciously large amounts of authentication requests on system 10, as further appreciated later.

In system 10, each bridge node $BRN_x$ is also coupled to one or more other bridge nodes, via a respective port. For example, bridge node $BRN_0$ is coupled to bridge node $BRN_1$ via a port $BP_{0.0}$, and bridge node $BRN_0$ is also coupled to bridge node $BRN_4$ via a port $BP_{0.1}$. Note that the coupling of bridge nodes as shown may be by direct connection or there could be intermediate nodes that are merely routing nodes and do not have the functionality of a bridge node, where typically such intermediate nodes are not included in the hop distance measurement between bridge nodes. In addition, system 10 also includes blocks $BLK_x$ to impose additional routing controls, where by way of example let that routing control be a spanning tree that thereby defines the path along which messages may be communicated within the bridged network. Thus, while two bridge nodes may have a physical connection between them, a block $BLK_x$ represents a logical break in that connection which thereby prevents communication along that connection, unless or until that block is removed. For example, a block $BLK_1$ is shown between bridge nodes $BRN_2$ and $BRN_3$. As a result of block $BLK_1$, bridge node $BRN_2$ may not communicate to $BRN_3$ without the communication passing through at least one other bridge node in system 10. For example, the path of communication from bridge node $BRN_2$ to $BRN_3$ spans a hop distance of four bridge nodes via $BRN_1$, $BRN_0$, $BRN_4$, and to $BRN_3$. In a similar manner, a block $BLK_2$ is shown between bridge nodes $BRN_1$ and $BRN_4$. As a result of block $BLK_2$, bridge node $BRN_1$ may not communicate to $BRN_4$ without the communication passing through at least one other bridge node in system 10. For example, the path of communication from bridge node $BRN_1$ to $BRN_4$ spans a hop distance of two bridge nodes via $BRN_0$ to $BRN_4$. In any event, from the illustration of FIG. 1, one skilled in the art will appreciate the remaining couplings along which communications may be achieved between bridge nodes in FIG. 1, which along with the above-discussed couplings are summarized in the following Table 1:

TABLE 1

| Bridge Node | Coupled bridge nodes |
|---|---|
| $BRN_0$ | $BRN_1$, via port $BP_{0.0}$ |
|  | $BRN_4$, via port $BP_{0.1}$ |
| $BRN_1$ | $BRN_0$, via port $BP_{1.4}$ |
|  | $BRN_2$, via port $BP_{1.2}$ |
| $BRN_2$ | $BRN_1$, via port $BP_{2.0}$ |
|  | $BRN5$, via port $BP_{2.3}$ |
| $BRN_3$ | $BRN_4$, via port $BP_{3.0}$ |
| $BRN_4$ | $BRN_0$, via port $BP_{4.1}$ |
|  | $BRN_3$, via port $BP_{4.3}$ |
| $BRN_5$ | $BRN_2$, via port $BP_{5.0}$ |

Continuing with system 10, for sake of example several of the bridge nodes are also shown as connected to user station nodes $US_{y,z}$, which may be referred to by other names such as a customer nodes or customer stations. The user station nodes are examples of nodes that may be implemented in the metro Ethernet, global Internet, or at remotely located networks, such as at different physical locations of a business entity. Typically, therefore, it is desirable for certain user station nodes to communicate data blocks with others, and a key function therefore of the bridge nodes is to facilitate such communication in a fashion that is not intrusive or even discernable to the user nodes. As a result, once an authentication is satisfactorily completed and authority is thereby granted to a user station in system 10 to communicate data blocks to the network, then it may do so with another user station in system 10 across great distances with transparency of the network layers and nodes between them. Further in this regard and as detailed in the Background of the Invention section of this document, when a user station is newly-connected (or re-booted or enabled) to a bridge station, the Extensible Authentication Protocol ("EAP") or a comparable methodology provides an authentication method whereby an authentication process commences and the genuineness of the new connection (i.e., new user station) is verified. Particularly, the existing bridge node to which the new link from the user station is connected becomes an authenticator with respect to the user station, and the new user station or the port on that node is a supplicant. The supplicant, in effect, requests to the authenticator an authentication which, if granted, permits the supplicant to join the trusted network. In response to the supplicant's request, the authenticator bridge node communicates with network server NS, either directly if the authenticator is directly connected to the server or logically through one or more bridge nodes that are in the path of the authenticator to network server NS. Thus, this process is referred to herein as an authentication session, which commences with the initial request of the supplicant and continues until the supplicant is granted or denied authority to join the network. Accordingly, when a user station creates a new connection with a bridge node, an authentication session is opened and directed to network server NS, and only if network server NS approves is that new connection permitted authority to communicate with other nodes in system 10. Concluding then the connectivity of the example of user stations in FIG. 1, they are summarized in the following Table 2:

TABLE 2

| Bridge Node | Coupled user station nodes |
|---|---|
| $BRN_0$ | None |
| $BRN_1$ | $US_{1.0}$, via port $BP_{1.0}$ |
|  | $US_{1.2}$, via port $BP_{1.1}$ |
| $BRN_2$ | $US_{2.1}$, via port $BP_{2.1}$ |
|  | $US_{2.2}$, via port $PB_{2.2}$ |
| $BRN_3$ | $US_{3.1}$, via port $BP_{3.2}$ |
|  | $US_{3.2}$, via port $BP_{3.3}$ |
|  | $US_{3.3}$, via port $BP_{3.4}$ |
| $BRN_4$ | $US_{4.0}$, via port $BP_{4.0}$ |
|  | $US_{4.1}$, via port $BP_{4.4}$ |
| $BRN5$ | $US_{5.1}$, via port $BP_{5.1}$ |
|  | $US_{5.2}$, via port $BP_{5.2}$ |
|  | $US_{5.3}$, via port $BP_{5.3}$ |

Having now introduced system 10, note that under various operations system 10 may operate according to the prior art such as by the forwarding of data blocks between bridge nodes and ultimately to and from user stations; however, in addition thereto the preferred embodiments improve resistance to overwhelming numbers of authentication requests, which may well be precipitated by a wrongdoer seeking to burden or stop the operation of the network. Thus, these various aspects of the preferred embodiments are described throughout the remainder of this document.

Figure 2:
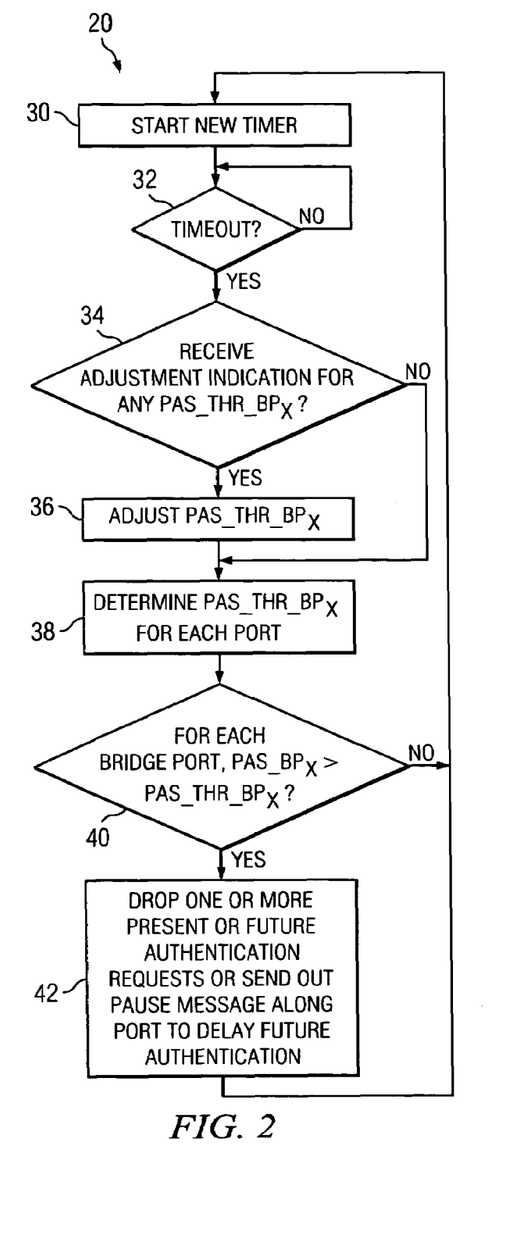
FIG. 2 illustrates a flowchart method to depict functionality that is included with each FIG. 1 bridge node that is connected to the network server by way of one or more additional bridges.

FIG. 2 illustrates a flowchart method 20 to depict functionality that is included with system 10 according to a preferred embodiment and, more particularly, is preferably implemented in each bridge node $BRN_x$; thus, in the example of FIG. 1, method 20 is implemented in each of bridge nodes $BRN_0$ through $BRN_5$ and it is to be understood that each such bridge includes sufficient circuitry for performing the following functionality, where some of the same circuitry may be used to perform different steps of that functionality under the direction of software and the like. By way of introduction, note that method 20 may be implemented in various forms such as by way of control, hardware and/or software and certain steps may be re-arranged in order or occur in parallel or by way of other process such as via a state machine or the like. However, to facilitate the following discussion, a particular order of the steps in sequential fashion is demonstrated. Also, note that in addition to method 20 various other functions as known in the art may be performed by system 10 as a whole or by one or more of its components. Indeed, the preferred embodiments contemplate that each bridge node $BRN_x$ is operable to receive from a user station a request to open a new connection to the network, which as detailed above commences by opening an authentication session between the user station as a supplicant and the bridge node as an authenticator, and which then continues with the authenticator communicating with network server NS (either directly if so connected or through one or more other bridge nodes) and these communications potentially continuing with various blocks of data back and forth until network server NS either grants or denies the user station's requested access to the network. Each bridge node $BRN_x$ may perform still other functions, but method 20 does not show such additional steps so as to focus on the novel aspects of the preferred embodiment.

Turning then to the first steps of method 20, it begins with steps 30 and 32, which together provide a function to cause the overall method to occur repeatedly over time. Particularly, in step 30 the bridge node $BRN_x$ starts a new time sequence, such as by initializing a timer (e.g., counter) and then causing it to advance. Next, method 20 continues from step 30 to step 32, which determines whether a timeout period of the step 30 timer as been reached. If the timeout is not reached, the flow returns from to step 32 in a circular fashion; thus, this circle repeats until the timeout is reached. At that point, method 20 continues from step 32 to step 34.

In step 34, the bridge node $BRN_x$ determines whether it has received an adjustment indication for a parameter referred to herein as $PAS\_THR\_P_x$, where that parameter as further appreciated below is a threshold (denoted by "THR") for the number of active port authentication sessions (denoted by "PAS") for a given port $P_x$ of the bridge node $BRN_x$. More specifically, each bridge has this threshold parameter for each of its ports, where the value may be differ from one port to the next and where the specific value may be established and maintained in manners ascertainable by one skilled in the art given the teachings of this document. Moreover, and as demonstrated later in connection with FIG. 3, also in the preferred embodiment a central resource, such as the bridge node connected directly to a network server NS (e.g., bridge node $BRN_0$ in FIG. 1), provides an oversight function to authentication sessions at more than one or possibly all bridge nodes in the network. As part of this function, that central resource can issue adjustments to the threshold $PAS\_THR\_BP_x$ used by a given bridge node, where the effect of such a change is detailed later. Returning then to the query of step 34, the bridge node determines whether it has received an indication to change a threshold $PAS\_THR\_BP_x$ for a corresponding one of its ports $BP_x$ (or for more than one such ports). By way of example, therefore, if step 34 is applied to bridge node $BRN_1$ of FIG. 1, then bridge node $BRN_1$ determines whether it has received an indication to change a threshold $PAS\_THR\_P_x$ for any of its bridge ports $BP_{1.0}$ through $BP_{1.4}$. If such an indication is received, method 20 continues from step 34 to step 36, where the appropriate threshold $PAS\_THR\_BP_x$ is changed as was indicated in step 34 to require such a change. Looking again then to bridge node $BRN_1$ as an example, assume in step 34 it determines that it received an indication from the central resource to change its threshold for its bridge port $BP_{1.1}$, that is, an indication in change for $PAS\_THR\_BP_{1.1}$. Thus, in step 36, such a change is accomplished. Next, or if no adjustment indication was received in step 34, method 20 continues to step 38.

In step 38, the bridge node $BRN_x$ determines how many authentication sessions are active through each of its ports, with this value being indicated as $PAS\_BP_x$ for each respective bridge port $BP_x$. In the preferred embodiment, an active authorization session is one that has been commenced and is not yet completed, where such completion may occur by granting authority to the supplicant or issuing a DoS thereto. Thus, with bridge node $BRN_1$ again as an example, it determines the number of active authentication sessions at each of its ports, but note that in the particular configuration of FIG. 1 that an authentication session is not likely to be initially commenced into bridge port $BP_{1.4}$ since it is not connected to a user station but instead is connected to the bridge node $BRN_0$ that is connected directly to network server NS; thus, step 38 has greater consequence with respect to the remaining bridge ports $BP_{1.0}$ through $BP_{1.3}$, although for completeness the count also could be made with respect to port $BP_{1.4}$. In any event, note in this regard that the commencement and activity of an authentication session are well-known in the art. Thus, at step 38, each bridge node $BRN_x$ will be readily able to comprehend for each of its ports the number of active authentication sessions. Note also that the activity to conclude each such session may vary and, hence, so too may the time from the commencement of the session to the completion of the session. In any event, therefore, step 38 then determines this number for a number if not all of the bridge's corresponding ports. Next, method 20 continues from step 38 to step 40.

In step 40, and preferably for each bridge port of the bridge node $BRN_x$, the bridge node $BRN_x$ compares the step 36 value of $PAS\_BP_x$ with the respective threshold $PAS\_THR\_BP_x$ for that port, where the latter was discussed above in connection with steps 34 and 36. Continuing with the example of bridge node $BRN_1$, for port $BP_{1.0}$ it compares a value $PAS\_BP_{1.0}$ with $PAS\_THR\_BP_{1.0}$, and for port $BP_{1.1}$ it compares a value $PAS\_BP_{1.1}$ with $PAS\_THR\_BP_{1.1}$, and so forth. For each comparison, if the value of $PAS\_BP_x$ does not exceed the respective threshold $PAS\_THR\_BP_x$, then method 20 returns the flow to step 30. However, also for each comparison, if the value of $PAS\_BP_x$ exceeds the respective threshold $PAS\_THR\_BP_x$, then method 20 continues from step 40 to step 42. Note, therefore, that in effect a bridge node $BRN_x$ performing step 40 is locally determining (i.e., at the bridge node), for one or more ports $BP_x$ of a bridge node, whether the number of active authentication sessions at that port exceeds the threshold number for such sessions. As such, if the number of active sessions does exceed the threshold, a corrective measure is taken, which as a part of the overall preferred embodiment provides enhanced performance of the network.

In step 42, the bridge node $BRN_x$ takes a corrective action to reduce the effect that is occurring at the overburdened port, that it, that port (or ports) at which a large number of active authentication sessions $PAS\_BP_x$ exists so that the number exceeds the port's respective threshold $PAS\_THR\_BP_x$. In alternative preferred embodiments, different respective corrective actions may be taken as well as a combination of those actions. For example, in one preferred embodiment approach, step 42 causes the bridge node to drop one or more currently active authentication sessions along the overburdened port. As another example, in another preferred embodiment approach, step 42 causes the bridge node to refuse to accept any new authentication sessions along the overburdened port for a period of time. As still another example, in another preferred embodiment approach, step 42 causes the bridge node to issue a message at the overburdened port, referred to herein as a pause message, informing any entity connected to that port to pause (or delay) any future request to commence a new authentication session along the overburdened port for a period of time. Still other corrective actions may be ascertained by one skilled in the art. In any event, once the action is taken, method 20 concludes and returns the flow to step 30.

Figure 3:
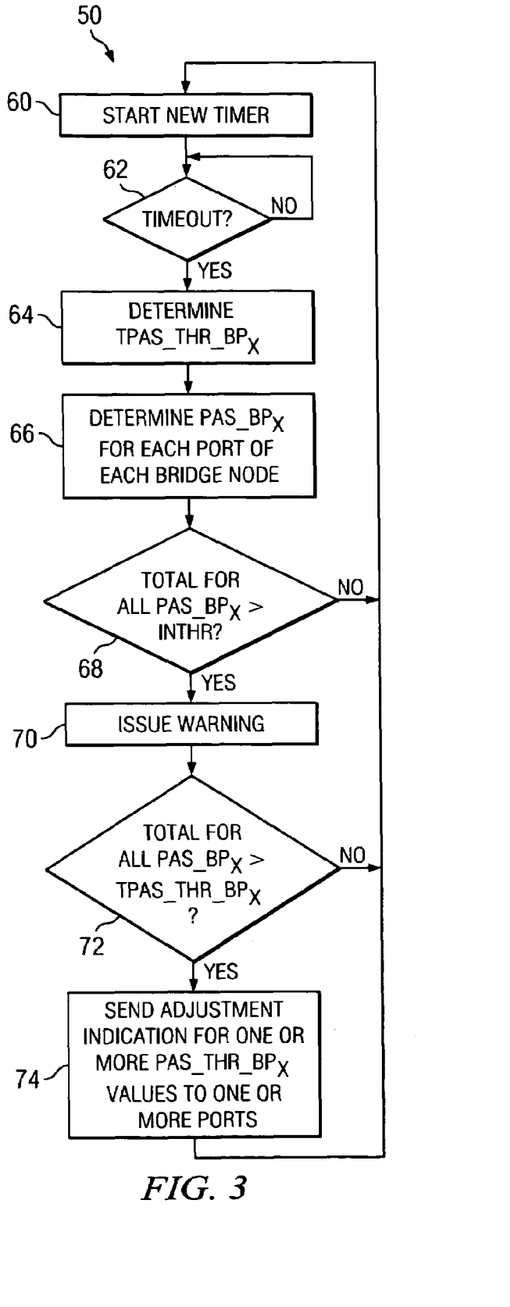
FIG. 3 illustrates a flowchart method to depict functionality that is included with a FIG. 1 bridge node that is connected directly to a network server.

FIG. 3 illustrates a flowchart method 50 to depict functionality that is included with system 10 according to a preferred embodiment and more particularly, is preferably implemented in the central resource introduced above in connection with step 34 of FIG. 2. In the preferred embodiment, this central resource is the bridge node $BRN_x$ that is connected directly to network server NS, which in the example of system 10 is bridge node $BRN_0$. As introduced above and as also detailed below, the central resource preferably oversees authentication sessions at more than one or possibly all bridge nodes in the network, and implementing this oversight functionality in the network-server-connected bridge node permits an efficient implementation of this methodology. However, in an alternative embodiment, the central resource may be some other processing unit that has sufficient hardware and/or software so as to communicate with various bridge nodes in a same network so as to accomplish the functionality described in this document. In any case, therefore, the remainder of this document illustrates and discusses the network-server-connected bridge as the central resource, but without intending to limit the inventive scope. Lastly and also by way of introduction, note that method 50, like method 20 discussed above, may be implemented in various forms such as by way of control, hardware and/or software, certain steps may be re-arranged in order or occur in parallel or by way of other process such as via a state machine or the like, and in addition to method 50 various other functions as known in the art may be performed by the central resource, whether independent from or connected as part of network-server-connected bridge.

Turning then to the first steps of method 50, it begins with steps 60 and 62, which together provide a function in the same manner as steps 30 and 32, respectively of method 20, that is, to cause the respective method 50 to occur repeatedly over time. Thus, in step 50 the central resource (e.g., bridge node $BRN_0$) starts a new time sequence, such as by initializing a timer (e.g., counter) and then causing it to advance. Next, method 50 continues from step 60 to step 62, which determines whether a timeout period of the step 60 timer as been reached. If the timeout is not reached, the flow returns from to step 62 in a circular fashion; thus, this circle repeats until the timeout is reached. At that point, method 50 continues from step 62 to step 64.

In step 64, the central resource determines a value of a threshold $TPAS\_THR\_BP_x$, which relates in part to the value of $PAS\_BP_x$ from method 20 of FIG. 2. First, recall that $PAS\_BP_x$ is the number of active authentication sessions at a port and is compared by each bridge node to a respective threshold (i.e., $PAS\_THR\_BP_x$ is) to determine if a port of such bridge is overburdened with authentication sessions and, if so, to take a corrective action to reduce that burden. In connection with step 64, the related parameter $TPAS\_THR\_BP_x$ represents a threshold (denoted by "THR") for comparison to a total (denoted by the leading "T" in the name) of the number of all authentication sessions active in the network, that is, all active authentication sessions open with respect to network server NS at a given time. The effect of using this threshold for comparison is described below, but before reaching that discussion note that the actual setting of the threshold may be based on various factors. For example, in the preferred embodiment the central resource is informed of as the number of user stations in the network, the types of users, and the threshold $PAS\_THR\_BP_x$ of each port of each bridge in the network. From this information, the threshold $TPAS\_THR\_BP_x$ is set to a value to provide a sufficient measure of comparison, as further appreciated below.

Following step 64 wherein $TPAS\_THR\_BP_x$ is determined, in step 66 the central resource obtains the values of $PAS\_BP_x$ for each port of each bridge node in the network. Note that step 64 is shown at this time in sequence following step 62 and may be achieved by the central resource issuing a request for this information from each bridge node, or alternatively each bridge node may be configured so as to periodically report this information to the central resource. In any event, therefore, step 64 represents a recognition that this data is made available to the central resource. Next, method 50 continues from step 66 to step 68.

In step 68, the central resource compares the total number of all active authentication sessions on the network to an initial network threshold INTHR. In this regard, note that this total number may be ascertained by the central resource in various ways. For example, since in the preferred embodiment the central resource is directly-connected to network server NS (e.g., bridge node $BRN_0$), then all authentication sessions are communicated through the central resource and it therefore may monitor the existence of those sessions and accumulate a total of them. As another example, since in step 66 the central resource obtains the number of sessions $PAS\_BP_x$ for each port in the network, then the total number of sessions may be determined by adding together those values of $PAS\_BP_x$ that correspond to each port that is directly-connected to a user station. Further in this regard, therefore, note that a port may be directly-connected to a user station or, alternatively, a port may be connected to a port on another bridge node. For example, looking to bridge node $BRN_5$, its ports $BP_{5.1}$, $BP_{5.2}$ and $BP_{5.3}$ are each connected to a respective user station; thus, the value of $PAS\_BP_x$ for each of these ports is reported by bridge node $BRN_5$ to network server NS. As an alternative or additionally, however, in the preferred embodiment a bridge-to-bridge connected port (e.g., $BP_{5.0}$) also may report a value of $PAS\_BP_x$ to network server NS, in which case that value should be the accumulated value from that bridge's user-station connected ports (e.g., $BP_{5.1}$, $BP_{5.2}$ and $BP_{5.3}$); moreover, therefore, the value of $PAS\_BP_x$ from a bridge-to-bridge port (e.g., $BP_{5.0}$) may thus be used to double check the values from the bridge-to-user station connected ports (e.g., ports $BP_{5.1}$, $BP_{5.2}$ and $BP_{5.3}$). Still other examples may be ascertained by one skilled in the art. Returning then to the comparison of step 68, for reasons more clear below, in the preferred embodiment initial threshold INTHR is set at a value that, if exceeded, causes a first level of response. More specifically, note at this point that the total of all values of $PAS\_BP_x$ resulting from direct port connections to user stations represents a measure of how many active authentication sessions are open across the entire network. As a result, by examining this value, the central resource is able to make a global (i.e., viewing the network as a whole) determination of the present burden imposed by the aggregate number of open authentication sessions. Thus, if this aggregate does not exceed initial threshold INTHR, then method 50 returns from step 68 to step 60, having thereby concluded that at that present time no further action is required with respect to responding to the number of open authentication sessions. To the contrary, if this aggregate exceeds initial threshold INTHR, then method 50 continues from step 68 to step 70, wherein as detailed below a response may be taken to the relatively large (i.e., threshold exceeding) aggregate.

In step 70, the central resource issues a warning notice, which may be communicated to one or more of various desired destinations. For example, the warning may be stored in network server NS, from where a network administrator (or "network manager") may access or receive notice of the warning. The warning notice may be merely a flag or indicator of the present condition such that upon becoming aware of the warning, the administrator is aware that the total number of open authentication sessions were above the initial threshold INTHR. The warning also may include the aggregate of all values of $PAS\_BP_x$ from step 66 and/or the individual values of $PAS\_BP_x$ from each such port of each node in the network. From the warning, the administrator may then take extra awareness or caution as to the network status, and the administrator also is provided the opportunity to examine whether the initial threshold INTHR was set properly and may benefit from an adjustment of that threshold. Note also that over time method 50 repeats and, thus, during some of those instances a respective step 70 warning may be issued; toward this end, a number or trend of those warnings and their data may be stored and reviewed over time, so as to demonstrate network trends, risks, and activity and also for sake of setting future thresholds for either of steps 20 or 50. In any event, following step 70, method 50 continues to step 72.

In step 72, the central resource compares the total of all values of $PAS\_BP_x$ resulting from direct port connections to user stations to the step 64 total threshold $TPAS\_THR\_BP_x$, where $TPAS\_THR\_BP_x$ is greater than the step 68 initial threshold INTHR. Further and as shown below, in the preferred embodiment total threshold $TPAS\_THR\_BP_x$ is established above in step 64 so that it is a value that, if exceeded, causes a second level of response which is different from the warning of step 70. More specifically, again the total of all values of $PAS\_BP_x$ resulting from direct port connections to user stations represents a measure of how many active authentication sessions are open across the entire network, and since $TPAS\_THR\_BP_x$ is greater than INTHR, then if $TPAS\_THR\_BP_x$ is exceeded the preferred embodiment seeks a greater level of response. More specifically therefore, if the total of all values of $PAS\_BP_x$ resulting from direct port connections to user stations does not exceed threshold $TPAS\_THR\_BP_x$, then method 50 returns from step 72 to step 60, having thereby concluded that at that present time no further action is required with respect to responding to the number of open authentication sessions. To the contrary, if this total of all values of $PAS\_BP_x$ resulting from direct port connections to user stations exceeds total threshold $TPAS\_THR\_BP_x$, then method 50 continues from step 72 to step 74, wherein as detailed below a response may be taken to the relatively large (i.e., threshold exceeding) aggregate.

In step 74, having been reached due to the number of total authentication sessions in the network exceeding the step 64 total threshold of $TPAS\_THR\_BP_x$, the central resource sends an adjustment indication to one or more bridge nodes in the network, wherein the adjustment indication commands that directed bridge node(s) to reduce its value of $PAS\_THR\_BP_x$ for its respective port $BP_x$. In other words, recall from method 20 that $PAS\_THR\_BP_x$ is a threshold used locally for each bridge node to compare the number of active authentication sessions at its port, $PAS\_BP_x$, to the corresponding threshold $PAS\_THR\_BP_x$ in an effort to respond and quell the amount of authentication sessions if that threshold is exceeded. Thus, in step 74, the central resource in effect directs the reduction of this local threshold to one or more ports which may be located at one or more bridge nodes in the network. Toward this end, recall that step 66 of method 50 informs the central resource of the number of active authentication sessions for each port of each bridge in the network. Accordingly, if step 72 is reached, the central resource may instantiate a method to evaluate which port or ports in the network are being relatively largely burdened by authentication sessions; since, recall, the central resource is informed of the number of user stations in the network, the types of users, and both the threshold $PAS\_THR\_BP_x$ and the active number $PAS\_BP_x$ of authentication sessions for each port of each bridge in the network, then one skilled in the art may readily implement such a method. In any event, once a port or ports are identified as being overburdened, then step 72 acts toward reducing that burden whereby the central network sends to that bridge node(s) with that port(s) an indication for that bridge to adjust its that $PAS\_THR\_BP_x$ downward. Recall then in method 20 that step 34 for each such bridge node will determine whether such an adjustment indication has been sent by the central resource and, if so, then in a subsequent step 36 the bridge node reduces its specified that $PAS\_THR\_BP_x$; thereafter, that reduced value of that $PAS\_THR\_BP_x$ is used by that node to perform step 40 for the corresponding port and, thus, if the newly-indicated and reduced $PAS\_THR\_BP_x$ is exceeded, then the bridge node locally takes the corrective action of step 42. In other words, therefore, returning to step 74 of method 50, the central resource from a global view of authentication sessions in the entire network issues a directive which, when followed, causes a local action on behalf of a bridge node to pushback against the number of then-present authentication sessions. Following step 74, method 50 returns to step 60 to start a new time cycle of analysis.

Figure 4:
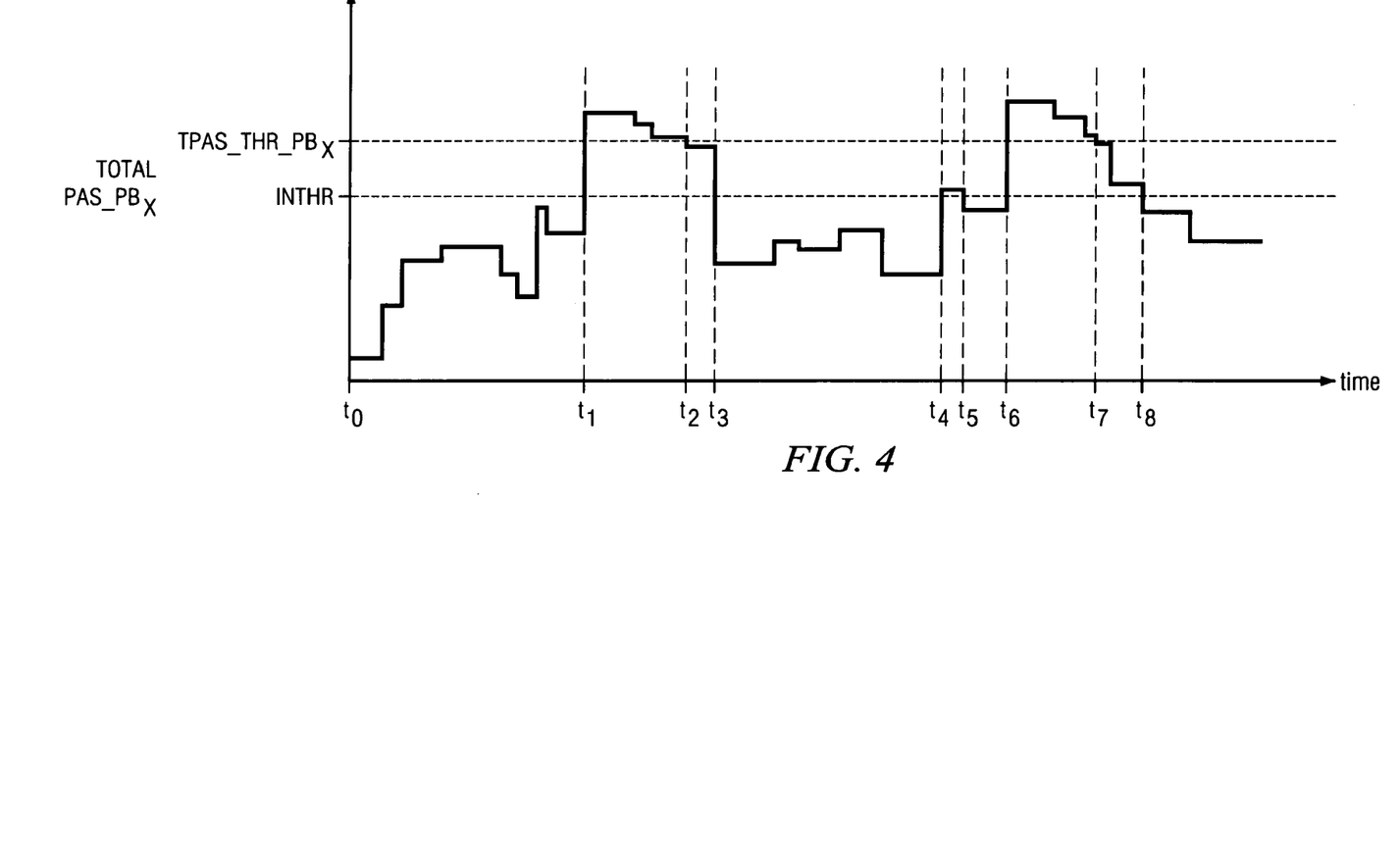
FIG. 4 illustrates a timing diagram of the operation of the preferred embodiments.

FIG. 4 illustrates a timing diagram so as to demonstrate an example of the operation of the preferred embodiments consistent with the preceding teachings. The vertical axis of the timing diagram illustrates the total number of open authentication sessions along a network, that is, the total of all values of $PAS\_PB_x$ from user-connected ports, while the horizontal axis illustrates time. Also shown are the two thresholds, INTHR and $TPAS\_THR\_PB_x$, both described in connection with method 50 of FIG. 3 and as applied by the central resource. Thus, the following discussion presents various observations at various times along the diagram, and for sake of understanding the details the examples are considered in connection with system 10 of FIG. 1.

At a time $t_0$, the total of all values of $PAS\_PB_x$ from user-connected ports is shown to be below either of the two thresholds INTHR and $TPAS\_THR\_PB_x$. From time $t_0$ to time $t_1$, various bridge nodes $BRN_x$ in system 10 have open authentication sessions, as illustrated by the graph as it moves to different levels between those times. Also during this time, recall from method 20 and steps 40 and 42 thereof that each port of each bridge node has an associated threshold $PAS\_THR\_BP_x$ that is used to ensure that the respective port does not have open more than that threshold's number of authentication sessions; in effect, therefore, during this time there is local, that is, at the bridge node, control to manage the number of open authentication sessions at each port of each bridge node. Moreover, recall from method 50 and step 66 thereof, the number of open authentication sessions for each port of each bridge node is provided to the central resource (e.g., bridge node $BRN_0$). Finally, because during this time period threshold INTHR is not exceeded, then the central resource continues to perform method 50 in a circular fashion from steps 60 through 68.

At time $t_1$ in FIG. 4, the total number of open authentication sessions is shown to change from a level below threshold INTHR to a level greater than both that threshold as well as the total threshold $TPAS\_THR\_PB_x$. Thus, while each bridge node continues its local analysis and possible response to open authentication sessions per method 20 of FIG. 2, in addition the central resource makes an affirmative decision in each of its steps 68 and 72 of method 50; thus, per step 70, a warning is issued and per step 74 one or more adjustment indications are issued to one or more ports of one or more bridge nodes to reduce the respective thresholds, $PAS\_THR\_BP_x$, of those ports. In response, each such bridge node, per steps 34 and 36 of method 20, reduces the respective thresholds, $PAS\_THR\_BP_x$ and continues with a local analysis in the steps 38 and 40 of whether the number of open authentication sessions for each port exceeds the respective threshold of the port; however, since one or more thresholds have been reduced, then in response one or more bridge nodes will now detect one or more ports with an amount of open authentication sessions greater than the port's respective threshold, and in response per step 42 some form of corrective action is taken to reduce the number of open authentication sessions through that port. In other words, the local control of each bridge node continues but is now managed in part by the central resource, which issued a reduced port threshold, PAS_THR_BP$_x$, for one or more parts. Returning then to FIG. 4, the local corrective action begins at time t$_1$ and thereafter there is a consequential reduction in the total number of open authentication sessions, that is, the total PAS_PB$_x$ from user-station-connected ports in the network. As method 50 continues to cycle, there may be additional iterations where step 72 detects an ongoing number of total authentication sessions greater than TPAS_THR_BP$_x$, in which case it will continue to send additional adjustments. This effect is shown in FIG. 4 as the continuing decline in total open authentication sessions after time t$_1$ and toward time t$_2$.

Continuing with FIG. 4 after time t$_1$, by time t$_2$, note that the total open authentication sessions falls below TPAS_THR_BP$_x$. In response and per method 50 and its step 72, at that point the central resource ceases at least for the time being to issue additional adjustments for local use by bridge nodes. However, note also that immediately following time t$_2$ the total open authentication sessions still exceed initial threshold INTHR. As a result, per method 50 and its steps 68 and 70, the central resource will continue to send warnings of this condition.

The preceding examples may be appreciated further by one skilled in the art as similar conditions continue over time in FIG. 4. For example, at time t$_3$, the total open authentication sessions fall below initial threshold INTHR and, thus, the central resource shortly thereafter issues no warnings and no indications for changes to be made to local bridge-level authentication session thresholds. Later, at time t$_4$, initial threshold INTHR is exceeded while total threshold TPAS_THR_PB$_x$ is not, so from times t$_4$ to t$_5$ the central resource again issues one or more warnings. Next, at time t$_5$, again both initial threshold INTHR and total threshold TPAS_THR_PB$_x$ are exceeded, so the central resource issues warnings as well as adjustment indications to be used locally at the bridge-to-user station level to scale back the number of local open authentication sessions, where that action will thus aggregate with the open authentication sessions elsewhere in the network to reduce the overall total number of network open authentication sessions. The remaining examples should be readily appreciated by one skilled in the art. From these examples, note that different actions may be taken based on different thresholds, and note further that the use of two thresholds (or more in yet other embodiments) may be implemented to avoid a back and forth action for a bridge node which could occur if only a single threshold were used in which case the bridge may be forced to more often adjust its local threshold if the overall open authentication sessions in FIG. 4 were repeatedly moving above and then below such a single threshold. Lastly, note also that the preceding describes the decrease of the local thresholds. In addition thereto, in the preferred embodiment some approach is taken to provide for an eventual increase in those local thresholds so as to support normal network operations. For example, a time limit could be imposed at the local level whereby each bridge node, after a period of time, increases its local port threshold, PAS_THR_BP$_x$ for each port. Note then that if such an increase permits an unacceptably large amount of authentication sessions to occur at a given port, then consistent with the above those sessions will contribute to an increase of sessions at the global level that is monitored by the central resource, and that central resource will detect this condition and then issue an adjustment indication to once again cause the overburdened port to have a reduced threshold, thereby again scaling back the burden on both that port locally as well as on the network globally. In an alternative, the central resource may increase particular values of PAS_THR_BP$_x$ according to various of the data the central resource has with respect to network conditions.

From the above, one skilled in the art should appreciate that the preferred embodiments provide a bridged computer network with both local (at the bridge node) as well as global (at a central resource) evaluation and control of the number of permitted open authentication sessions. In this manner, therefore, there is a distributed methodology that efficiently detects an effort to attack a network with an overburdening amount of authentication requests. By detecting the attack, it may be controlled on a port-by-port basis, thereby mitigating the incidence of denial of service that would otherwise result from flooding of a network with authentication requests. Further, this approach detects attacks that are local to a single port as well as those that are distributed to either different ports at a same bridge node or even those that are distributed to different ports at different bridge nodes. Thus, network operation may be more stable and resources that otherwise may be affected by such an attack are spared. As still other benefits, various of the drawbacks of other prior art approaches are minimized or avoided. These benefits as well as others will be appreciated by one skilled in the art. Indeed, as a final benefit, while the present embodiments have been described in detail, various substitutions, modifications or alterations could be made to the descriptions set forth above without departing from the inventive scope which is defined by the following claims.

The invention claimed is:

1. A bridged network system, comprising:
   at least one network server for receiving and responding to authentication session requests;
   a plurality of bridge nodes, wherein each bridge node in the plurality of bridge nodes is connected to communicate with at least one other bridge node in the plurality of nodes, and wherein each bridge node in the plurality of bridge nodes comprises:
   at least one port;
   means for communicating with at least one of either another bridge node in the plurality of nodes or the at least one network server; and
   means for limiting a number of authentication sessions active at a same time through the at least one port; and
   a central resource, comprising means for directing at least two bridge nodes in the plurality of bridge nodes to limit a number of authentication sessions active at a same time through the at least one port, in response to a number of authentication sessions active at a same time through two or more bridge nodes in the plurality of bridge nodes.

2. The system of claim 1 wherein the central resource is a bridge node in the plurality of bridge nodes.

3. The system of claim 2 wherein the central resource is coupled to the at least one network server without a bridge node connected between the central resource and the at least one network server.

4. The system of claim 1 wherein the means for directing in response to a number is operable in response to a number of authentication sessions active at a same time to the at least one network server.

5. The system of claim 1 wherein the means for directing in response to a number is operable in response to a number of authentication sessions active through all user-station-connected ports of bridge nodes in the plurality of bridge nodes.

6. The system of claim 1:
   wherein the means for limiting a number of authentication sessions active at a same time through the at least one port comprises means for comparing the number of authentication sessions active at a same time to a threshold; and wherein the means for directing is for providing an indication to each bridge node to change the threshold.

7. The system of claim 1 wherein the central resource further comprises means for issuing a warning in response to the measure exceeding a threshold.

8. The system of claim 1 wherein the means for limiting a number of authentication sessions active at a same time through the at least one port is for providing a pause message to a unit connected to the at least one port.

9. The system of claim 1 wherein the means for limiting a number of authentication sessions active at a same time through the at least one port is for providing a denial of service message to a unit connected to the at least one port.

10. The system of claim 1:
wherein the plurality of bridge nodes consists of an integer number of bridge nodes; and
wherein the means for directing is for directing all of the integer number of bridge nodes in response to a number of authentication sessions active at a same time through all of the integer number of bridge nodes.

11. The system of claim 1 wherein the plurality of bridge nodes comprise Ethernet bridge nodes.

12. The system of claim 1:
wherein the central resource is a bridge node in the plurality of bridge nodes; and
wherein the means for directing in response to a number is operable in response to a number of authentication sessions active at a same time to the at least one network server.

13. The system of claim 12:
wherein the means for limiting a number of authentication sessions active at a same time through the at least one port comprises means for comparing the number of authentication sessions active at a same time to a threshold; and
wherein the means for directing is for providing an indication to each bridge node to change the threshold.

14. A central resource for use in a bridged network system, the system comprising a plurality of bridge nodes, wherein each bridge node in the plurality of bridge nodes is connected to communicate with at least one other bridge node in the plurality of nodes, the central resource comprising:
circuitry for communicating with each bridge node in the plurality of bridge nodes; and
circuitry for selectively directing specified different bridge nodes in the plurality of bridge nodes to reduce a number of authentication sessions active at a same time through the directed bridge node, in response to a number of authentication sessions active at a same time through two or more bridge nodes in the plurality of bridge nodes.

15. The central resource of claim 14 wherein the central resource is a bridge node in the plurality of bridge nodes.

16. The central resource of claim 14 and further comprising circuitry for coupling to at least one network server for communicating with respect to authentications session requests.

17. The central resource of claim 16 wherein the circuitry for selectively directing directs in response to a number of authentication sessions active at a same in communication with the at least one network server.

18. A method of operating a bridged network system, comprising:
receiving authentication requests at ports of a plurality of bridge nodes, wherein each bridge node in the plurality of bridge nodes is connected to communicate with at least one other neighboring bridge node in the plurality of nodes;
communicating received authentication requests to at least one network server; and
directing specified bridge nodes in the plurality of bridge nodes to reduce a number of authentication sessions communicated to the at least one network server in response to a number of authentication sessions active at a same time through two or more bridge nodes in the plurality of bridge nodes.

19. The method of claim 18 wherein the directing step is in response to a number of authentication sessions active at a same time through each bridge port of each bridge node in the plurality of bridge nodes that is connected to a user station.

20. The method of claim 18 wherein the directing step is in response to a number of authentication sessions active at a same time to the at least one network server.

* * * * *

UNITED STATES PATENT AND TRADEMARK OFFICE
CERTIFICATE OF CORRECTION

PATENT NO. : 7,652,991 B2  Page 1 of 1
APPLICATION NO. : 11/305560
DATED : January 26, 2010
INVENTOR(S) : Ge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Twenty-eighth Day of December, 2010

David J. Kappos
*Director of the United States Patent and Trademark Office*